United States Patent [19]

Harra et al.

[11] 4,303,251
[45] Dec. 1, 1981

[54] FLANGE SEALING JOINT WITH REMOVABLE METAL GASKET

[75] Inventors: David J. Harra, Palo Alto; William C. Nystrom, Santa Clara, both of Calif.

[73] Assignee: Varian Associates, Inc., Palo Alto, Calif.

[21] Appl. No.: 170,233

[22] Filed: Jul. 18, 1980

Related U.S. Application Data

[63] Continuation of Ser. No. 966,230, Dec. 4, 1978, abandoned.

[51] Int. Cl.$^3$ .............................................. F16J 15/08
[52] U.S. Cl. .................................. 277/236; 277/167.5
[58] Field of Search ............... 277/236, 225, 190, 191, 277/167.5; 285/324, 363, 364, 369, DIG. 8

[56] References Cited

U.S. PATENT DOCUMENTS

| 448,765 | 3/1891 | Kaiser | 285/119 |
|---|---|---|---|
| 812,642 | 2/1906 | Grombie | 285/350 |
| 1,595,310 | 8/1926 | Mueller et al. | 285/338 |
| 2,209,882 | 7/1940 | Galloway | 164/62 |
| 2,257,213 | 9/1941 | Wolfrom | 220/240 |
| 2,867,463 | 8/1961 | Bernard | 277/225 |
| 2,926,937 | 3/1960 | Parsons | 285/350 |
| 3,208,758 | 9/1965 | Carlson | 277/236 |

FOREIGN PATENT DOCUMENTS

| 968098 | 1/1958 | Fed. Rep. of Germany . | |
| 1106559 | 5/1961 | Fed. Rep. of Germany . | |
| 1228871 | 11/1966 | Fed. Rep. of Germany | 277/167.5 |
| 6730 | of 1914 | United Kingdom . | |

Primary Examiner—Robert I. Smith
Attorney, Agent, or Firm—Stanley Z. Cole; Keiichi Nishimura

[57] ABSTRACT

An all-metal joint is provided wherein a metal gasket disposed between mating flanges can readily be removed when the joint is disassembled. Opposing faces of the mating flanges are configured to provide a recess between the flanges in which a soft metal gasket of annular configuration can be received when the flanges are coupled together. Symmetrically disposed ridges on the opposing flange faces penetrate into a peripheral region of the gasket, thereby causing a portion of the gasket material to flow into an annular groove that forms the periphery of the recess between the opposing flange faces. This compressed material in the annular groove provides a gas-tight seal between the mating flanges. The configuration of the opposing flange faces is such that when the joint is dissassembled, the net force tending to retain the gasket in position against either one of the flange faces is minimized. In particular, each flange face is configured so that the residual compressive forces present when the flange coupling mechanism is released, distributed over the surface of the gasket, are in net effect substantially equal to or greater than the frictional and bonding forces that might tend to retain the gasket in contact with either flange. In this way, the gasket tends to break away from the mating flange faces when the joint is disassembled.

6 Claims, 7 Drawing Figures

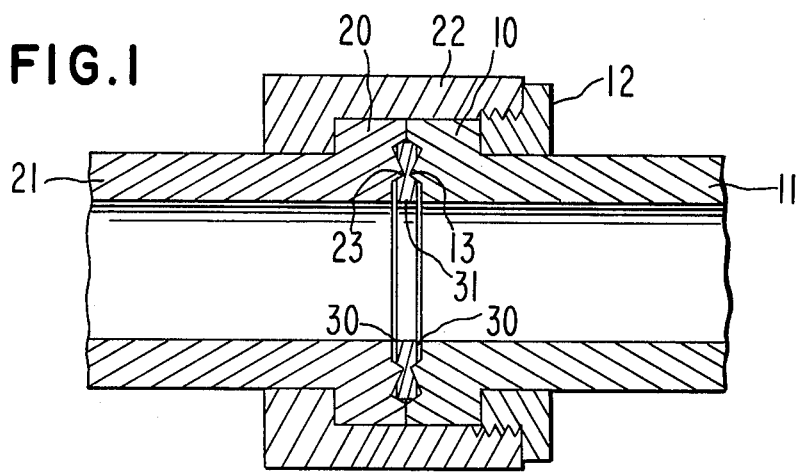
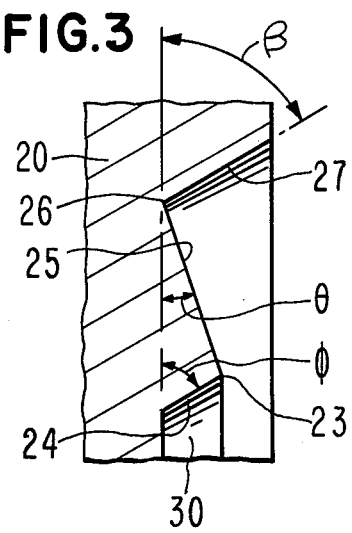
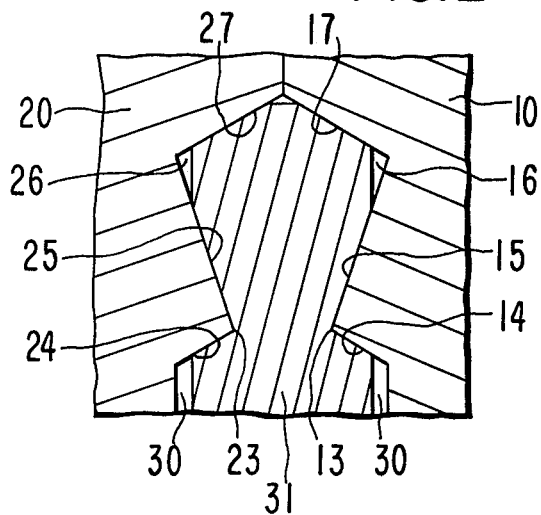
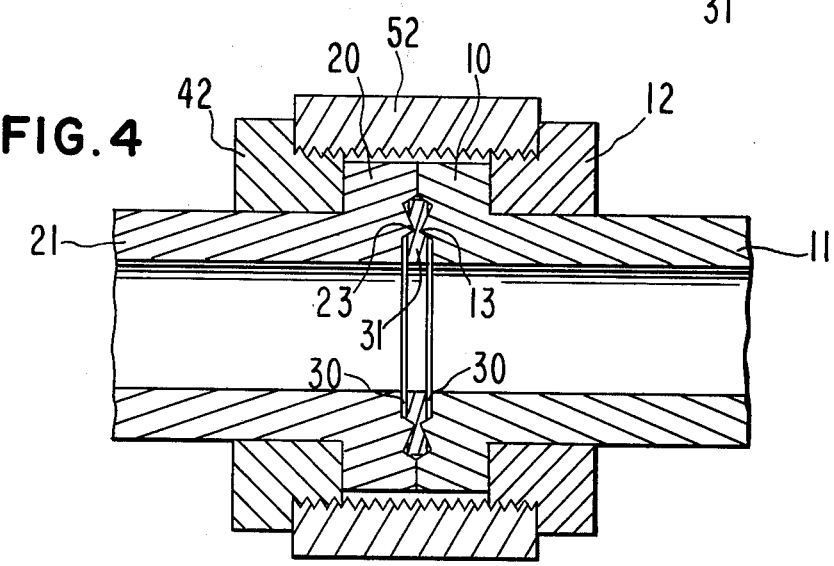

FLANGE SEALING JOINT WITH REMOVABLE METAL GASKET

This is a continuation of application Ser. No. 966,230 filed Dec. 4, 1978 and now abandoned.

BACKGROUND OF THE INVENTION

This invention is an improvement in the gas-tight flange coupling art, and has particular application with respect to high-vacuum and high-pressure flange joints.

All-metal flange joints for use in applications requiring high-temperature and/or frequent bake-out of an assembled joint are known to the prior art. In particular, U.S. Pat. No. 3,208,758 to M. A. Carlson et al., assigned to Varian Associates, Inc., discloses an all-metal flange joint in which a gas-tight seal between mating flanges is provided by the flowing of soft metal gasket material into an annular groove formed between the facing flange surfaces when the two mating flanges are pressed together.

In the flange joint disclosed in U.S. Pat. No. 3,208,758, the opposing flange faces were configured so that a soft metal gasket could be received in a recess provided therebetween when the flanges are pressed together. Corresponding annular ridges were provided on the opposing gasket faces to project into the recess so as to penetrate into opposite sides of a peripheral region of the gasket located in the recess. A portion of the gasket material was thereby caused to flow into an annular groove that formed the periphery of the recess between the opposing flange faces. This groove was dimensioned to have a volume larger than the volume of gasket material that could flow into the groove, thereby preventing gasket material from completely filling the groove. If an excess of gasket material were permitted to enter the annular groove, the opposing flange faces would be pushed apart. Proper dimensioning of the groove served to provide a gas-tight seal in the nature of a compressed O-ring, which could withstand pressure differentials limited only by the tensile strength of the metal gasket.

With prior art flanges of the type described above, however, difficulty was encountered in disassembling the flange joint after a seal had been made. Typically, such prior art flanges were coupled by bolting the two opposing flanges together. Such bolting or other compressive coupling of the mating flange faces caused compression of the gasket disposed therebetween, and resulted in the extrusion of soft metal from the periphery of the gasket into an annular groove formed at the periphery of the recess between the opposing flange faces. When the mating flanges were subsequently unbolted in order to disassemble the joint, however, the metal gasket frequently remained stuck to one or the other, or to both, of the flange faces.

When a soft metal gasket has been severely compressed against the surface of a harder metal, a surface bonding phenomenon in the nature of a weld occurs. In addition, a frictional restraining force dependent upon the coefficient of friction of the soft metal gasket material with respect to the harder surface of the flange tends to oppose movement of the gasket away from the flange.

In the prior art, the tendency of the metal gasket to remain affixed to one or the other, or to both, of the mating flanges was not an insurmountable problem in disassembling the joint when sufficient leverage was possible for applying an external force to separate the flanges. If, after separation of the flanges, the soft metal gasket remained attached to one or other of the flanges, the gasket could usually be removed quite easily by a hand tool for prying the gasket away from the flange to which it was attached. However, with the recent proliferation of applications requiring mini-flanges (i.e. flanges having a seal diameter of less than about one inch), the inaccessibility of mini-flange gaskets to removal by hand-held prying tools has become a significant problem. Also, with large-diameter flanges (e.g., diameters larger than $2\frac{3}{4}$ inches), difficulty has been encountered in disassembling flange joints because of the large external force required to separate the gasket from either one of the flange faces. In many applications, it is advantageous from a system design standpoint to locate flanged coupling ports in places that are relatively inaccessible; and hence, a flange joint that does not readily disassemble is a serious inconvenience.

What is needed, therefore, is an all-metal flange joint in which the gasket tends to break away from the mating flange faces when the joint is disassembled.

SUMMARY OF THE INVENTION

It is an object of the present invention to provide an all-metal flange joint having a soft metal gasket disposed between mating flange faces, which gasket can be easily removed when the joint is disassembled.

It is a particular object of this invention to provide an all-metal joint for coupling mini-flanges (i.e., flanges having a diameter of less than about one inch), the joint comprising a soft metal gasket disposed between opposing faces of the mating mini-flanges, the gasket being easily removable when the joint is disassembled.

In order to accomplish the foregoing objects, the opposing faces of the mating flanges are configured to form a recess therebetween in which a soft metal gasket can be disposed when the opposing flange faces are pressed together. Oppositely disposed annular ridges on the faces of the mating flanges project into the recess so as to penetrate into opposite sides of a peripheral portion of the gasket. Compression of the gasket caused by the pressing of the opposing flange faces together causes a portion of the gasket material to extrude into an annular groove formed at the periphery of the recess between the two opposing flange faces. This compressed gasket material in the annular groove provides a gas-tight seal in the nature of a compressed metal O-ring in the groove between the flange faces. As in the prior art, the annular groove is dimensioned to have a volume larger than the volume of the gasket material that can flow into the groove. In this way, the volume of the groove can accommodate all of the gasket material that flows therein; and any excess of gasket material that might otherwise tend to push apart the mating flange faces is prevented from entering the groove. By way of distinction from the prior art, the configuration of the opposing flange faces according to the present invention is such that the residual compressive forces present when the flange coupling mechanism is released, distributed over the surface of the gasket, are substantially equal to or greater than the frictional and bonding forces that tend to retain the gasket in contact with either flange.

In particular, according to the present invention, the surface portions of the flange faces defining the annular groove into which the gasket material can be extruded are inclined at other than a right angle with respect to the interface between the mating flange faces. In this way, the distributed compressive force exerted upon the gasket by each surface defining the groove has a component that tends to push the gasket away from contact with the flange face. Thus, according to the present invention, the gasket tends to break away from the mating flange faces when the joint is disassembled.

BRIEF DESCRIPTION OF THE DRAWING

FIG. 1 is a cross-sectional view in the longitudinal plane of an all-metal joint between two mating flanges coupled by a union comprising a male member on one flange and a female member on the other flange.

FIG. 2 is an enlarged view of a portion of the joint between the mating flanges shown in FIG. 1.

FIG. 3 is a cross-sectional view of a portion of the face of one of the flanges shown in FIG. 2.

FIG. 4 is a cross-sectional view in the longitudinal plane of an all-metal joint between two mating flanges coupled by a union comprising a threaded male member bearing on each flange and a double-ended female member for engaging both male members.

DESCRIPTION OF PREFERRED EMBODIMENTS

Figure 5:
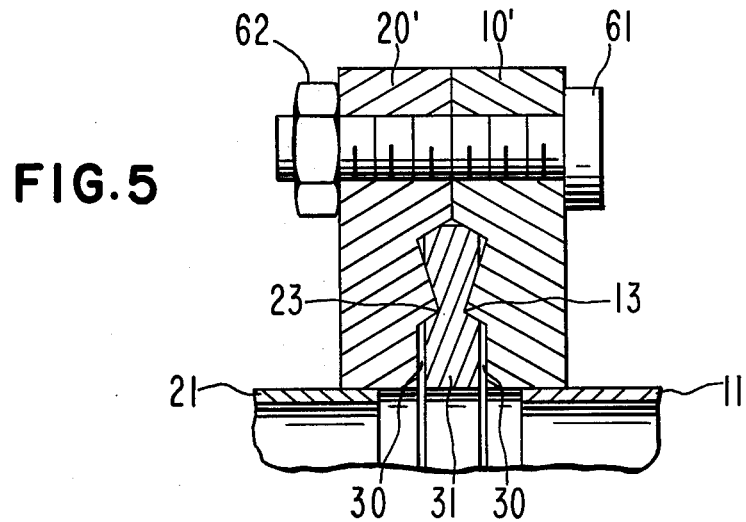
FIG. 5 is a cross-sectional view in the longitudinal plane of a portion of an all-metal joint between two mating flanges coupled by bolting.

FIG. 1 illustrates an all-metal flange joint according to the present invention, whereby a gas-tight seal is provided between flanged end portions 10 and 20 of pipes 11 and 21; respectively. The flanges 10 and 20 are coupled by means of a union comprising a male member 12 bearing on the pipe 11 and a female member 22 bearing on the pipe 21.

As shown in FIG. 1, the male member 12 is of annular configuration having a threaded outer surface portion, and is disposed to slide longitudinally along the pipe 11. The inside diameter of the male member 12 is less than the outside diameter of the flange 10, whereby the male member 12 is prevented from slipping off the flanged end of the pipe 11. Correspondingly, the female member 22 is of annular configuration having a threaded inner surface portion, and is disposed to slide longitudinally along the pipe 21. The female member 22 has an inside diameter that is less than the outside diameter of the flange 20, whereby the female member 22 is prevented from slipping off the flanged end of the pipe 21.

When opposing faces of the flanges 10 and 20 are brought into mating contact, the female member 22 extends over the flanges 20 and 10 and engages the threaded outer surface portion of the male member 12. In this way, coupling of the flanged pipes 11 and 22 is accomplished by tightening the female member 22 around the male member 12.

The opposing faces of the flanged end portions 10 and 20 are configured to provide a recess 30 therebetween, in which a soft metal gasket 31 can be disposed. The gasket 31 is of annular configuration and is made of a material that is more malleable than the material from which the flanged end portions 10 and 20 are composed. Typically, the flanged end portions 10 and 20 are made of stainless steel, in which case the metal gasket 31 can suitably be an annular copper ring of planar configuration. Other suitable gasket materials for use in conjunction with stainless steel mating flanges include nickel, aluminum, various alloys, and combinations of base metal coated with soft metal.

As shown in greater detail in FIG. 2, the face of the flanged portion 10 of the pipe 11 is configured to have an annular ridge 13 projecting into the recess 30. Similarly, an opposing annular ridge 23 on the face of the flanged portion 20 of the pipe 21 projects from the opposite direction into the recess 30, whereby the ridges 13 and 23 penetrate into the soft metal material on opposite sides of the periphery of the gasket 31. Compression of the gasket 31 by the mating of the flanges 10 and 20 causes extrusion of gasket material into a groove formed at the periphery of the recess 30.

With further reference to FIG. 2, the annular ridge 13 is formed on the face of the flange 10 by the intersection of conical surface regions 14 and 15; and an annular trough 16 is formed by the intersection of conical surface regions 15 and 17. Similarly, the annular ridge 23 is formed on the face of the flange 20 by the intersection of conical surface regions 24 and 25; and an annular trough 26 is formed by the intersection of conical surface regions 25 and 27. When the flanges 10 and 20 are fitted tightly together, the conical surface regions 15, 17, 25 and 27 together form the boundary of the annular groove into which the soft metal gasket material is extruded. This extruded gasket material forms the equivalent of a compressed metal O-ring, which provides a gas-tight seal between the flanges 10 and 20.

The annular groove, which is bounded by the surface regions 15 and 17 on flange 10 and the surface regions 27 and 25 on flange 20, is dimensioned to have a volume that is larger than the volume of gasket material that can be extruded therein due to the pinching effect of the ridges 13 and 23 upon the gasket 31. Thus, the amount of gasket material that can enter the annular groove is small enough to prevent separation of the flanges 10 and 20.

In FIG. 3, the orientations with respect to each other of surface regions 24, 25 and 27 on the face of the flange 20 are shown in greater detail. Correspondingly symmetric orientations of the surface regions 14, 15 and 17 on the face of the flange 10 are similarly provided.

As shown in FIG. 3, the surface region 25 declines away from the ridge 23 to the trough 26, from whence the surface region 27 extends to the interface plane between the mating flanges 20 and 10. The conical surface region 24 makes an acute angle $\phi$ with respect to the interface plane of the mating flanges. Similarly, the surface region 25 makes an acute angle $\theta$ with respect to that same interface plane. The angle $\phi$ is preferably in the range from 60° to 75°; and the angle $\theta$ is preferably in the range from 15° to 30°.

In a symmetrically similar manner, the conical surface region 14 on the face of the flange 10 makes an acute angle $\phi$ with respect to the interface plane between the flanges 10 and 20; and the conical surface region 15 makes an acute angle $\theta$ with respect to the same interface plane. Thus, facing surfaces of the flanges 10 and 20 are symmetrically arranged with respect to each other.

Both the conical surface region 27 on the flange 20 and the corresponding conical surface region 17 on the flange 10 make an angle $\beta$ with respect to the interface plane of the mating flanges 10 and 20. According to the present invention, the angle $\beta$ is an acute angle. In the prior art, there was no suggestion to make the angle $\beta$ an acute angle.

Figure 7:
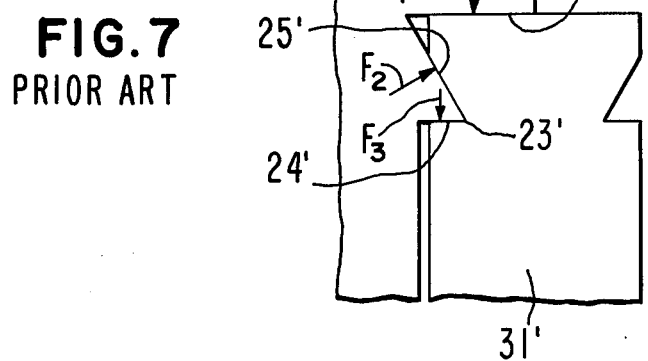
FIG. 7 is a force diagram representing the distributed compressive forces exerted on a gasket by the surfaces of a flange face configured according to the prior art when the flange coupling mechanism is released.

The schematic illustration in FIG. 7 on the other hand is representative of flange joints of the prior art wherein, unlike the joint of the present invention, the terminal wall 27' of the annular groove into which extruded gasket material was confined was perpendicular to the interface plane between the mating flanges. The angle $\beta$ of the present invention, by way of contrast with the prior art, is an acute angle (preferably in the range from 60° to 75°). This novel configuration for the terminal wall of the annular groove (i.e., the wall formed by the surface regions 27 and 17), together with the prescribed configuration for the surface regions 24 and 14, enables the gasket 31 to be removed much more easily when the joint is disassembled than was possible in the prior art.

For convenience in fabrication, the conical surfaces 24 and 27 on the face of the flange 20 could be parallel to each other, i.e., it is possible for $\phi = \beta$ provided that $\beta$ is an acute angle. However, it is not necessary for the practice of this invention that $\phi = \beta$. It is desirable that the angle $\beta$ be less than 75° so that the normal to the surface region 27 will have a relatively large component perpendicular to the interface plane between the mating flanges. If $\beta$ becomes too small, however, the outside diameter of the flanges 10 and 20 would correspondingly become inconveniently large for standard design considerations. It is not desirable for $\phi$ to be much smaller than about 30°, because the extension of the ridge 23 into the recess 30 decreases as $\phi$ decreases. An appropriate range for the angle $\phi$ is from 60° to 75°; and an appropriate range for the angle $\theta$ is from 15° to 30°.

When the flanges 10 and 20 are pressed together, whether by the technique shown in FIG. 1 whereby the threaded female union member 22 is tightened over the threaded male member 12, or by any other appropriate coupling technique such as those to be discussed hereinafter in connection with FIGS. 4 and 5, the ridges 13 and 23 protrude into the soft metal gasket 31 and cause a peripheral portion thereof to be extruded into the annular groove bounded by the surface regions 15, 17, 27 and 25. In the flange coupling technique shown in FIG. 4, the female member 22 of FIG. 1 is replaced by a male member 42 that is disposed to slide longitudinally along the pipe 21. The inside diameter of the male member 42 is less than the outside diameter of the flange 20, whereby the male member 42 is prevented from slipping off the flanged end of the pipe 21. An outer surface portion of the male member 42 is threaded, just as is a corresponding outer surface portion of the male member 12 on the pipe 11. A cylindrical female member 52, whose inner surface is threaded, can simultaneously engage the threaded outer surface portions of the male members 12 and 42 when the flanges 10 and 20 are in mating contact. In practice, the female member 52 is first tightened onto one of the male members (e.g., male member 42), and then the other male member 12 is threaded into the female member 52 and tightened. In this way, the flanges 10 and 20 are brought into mating contact.

Another flange coupling technique is shown in FIG. 5, wherein a flange member 10' is affixed to an end of the pipe 11 by an appropriate technique such as welding. Similarly, a flange member 20' is affixed to an end of the pipe 21. The soft metal gasket 31 is compressed between the opposing flange members 10' and 20' by bolting one flange member to the other. As shown in FIG. 5, a bolt 61 passed through aligned holes in the flange members 10' and 20', and a nut 62 threadably engages the protruding end of the bolt 61. The bolt 61 and the nut 62 are representative of a plurality of similar bolts and nuts peripherally disposed (and preferably uniformly spaced) around the mating flanged members 10' and 20'.

When the flanged portions 10 and 20 as shown in FIGS. 1 and 4 (or the flanged members 10' and 20' of the embodiment shown in FIG. 5) are pressed together, the ridges 13 and 23 of the opposing flange faces protrude into the soft metal gasket 31, thereby causing a peripheral portion of the gasket material to flow into an annular groove formed at the perimeter of the recess 30 between the opposing flanged faces. This groove, which is bounded by the surfaces 15 and 17 on flanged portion 10 and by the surfaces 27 and 25 on flanged portion 20, has a total volume that is greater than the volume of gasket material that can be extruded into the groove. As explained above, since less than the entire volume of the groove can be occupied by gasket material, the contacting faces of the flanged portions 10 and 20 cannot be pushed apart by gasket material in the groove. The compressed gasket material in the annular groove functions as a metal O-ring under compression to provide a gas-tight seal between the mating faces of the flanged portions 10 and 20.

Figure 6:
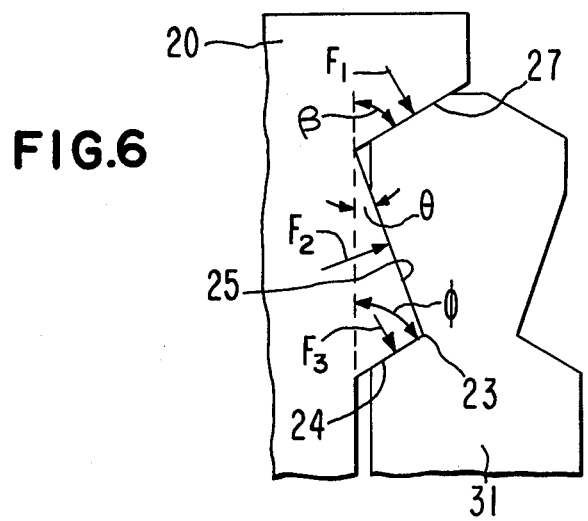
FIG. 6 is a force diagram representing the distributed compressive forces exerted on a gasket by the surfaces of a flange face configured according to the present invention when the flange coupling mechanism is released.

As illustrated in FIG. 6, the residual distributed compressive forces $F_1$, $F_2$ and $F_3$ present when the flange coupling mechanism is released, and which are exerted, respectively, by the surface regions 27, 25 and 24 of the flanged portion 20 upon the gasket 31, are represented by arrows normal to their respective surfaces. These compressive forces tend to push the gasket 31 away from contact with the flanged portion 20. Corresponding symmetrically acting distributed compressive forces exerted by the corresponding surface regions 17, 15 and 14 of the flanged portion 10 upon the other side of gasket 31 likewise tend to push the gasket 31 away from contact with the flanged portion 10.

When it is desired to uncouple the flanges 10 and 20 in order to disassemble the joint, it is usually also desirable to remove the gasket 31. Quite often in the prior art, however, it was difficult to break the seal between two mating flanges because of bonding and frictional forces that tended to keep the gasket in contact with the faces of the flanges. Bonding forces in the nature of cold welds would develop due to the compression of the gasket against the flanges. Frictional forces acting parallel to the surfaces of the flanges in directions opposite to the forces tending to push the gasket away from contact with the flanges would also develop. Even after the two mating flanges were separated in the prior art, the gasket would frequently remain attached to one or other of the flanges. In accordance with the present invention, the faces of the opposing flanges are configured in such a way as to minimize the forces that tend to prevent removal of the gasket after the flange coupling mechanism has been released (e.g., by uncoupling the threaded unions shown in FIGS. 1 and 4, or by loosening and removing the nuts 62 shown in FIG. 5).

Referring to FIG. 6, the residual compressive force component F acting to push the gasket 31 away from contact with the flange 20 is given by the equation:

$$F = F_1 \cos \beta + F_2 \cos \theta + F_3 \cos \phi.$$

This net compressive force component F increases as the angles $\beta$, $\theta$ and $\phi$ decrease. It is desirable for $\theta$ to be in the range from 15° to 30°, and for $\phi$ to be in the range from 60° to 75°, so that the ridge 23 will protrude sharply enough into the recess 30 so as to cause extrusion of material from the periphery of the gasket 31. According to the present invention, the angle $\beta$ is minimized to the extent practicable in order to provide a component of the compressive force $F_1$ in the direction opposite to the frictional force component that tends to keep the gasket 31 in contact with the surface region 27.

Ease in disassembling an all-metal flange joint of the kind used in high-pressure and high-vacuum applications is the primary objective of this invention. The diameter of the flanges to be joined is not material to the definition of this invention, although the invention is of special value with respect to mini-flange joints located in areas that are not readily accessible to disassembly by means of hand-held tools.

The practice of this invention may be accommodated by providing a variety of coupling techniques for mating the opposing faces of the flanges to be joined. In particular, the coupling technique illustrated in FIG. 4 (i.e., use of a union comprising a male member on each flange and a female member that engages each male member) provides a convenient way to join a number of sections of flanged piping without having to arrange components so as to provide matching male and female union members on the respective ends of flanges to be joined. Where appropriate, a helium gas access hole could be provided through one or both mating flange members to the peripheral region of the recess formed therebetween, whereby the gas-tight integrity of the flange joint can be monitored by techniques well-known to those skilled in the art. The nature of the piping to be joined can vary according to the type of system in which the piping is used. It is contemplated that a flange joint according to this invention can be used to couple pipes of any diameter and configuration, including pipes having expandable "bellows" sections. Other uses for an all-metal joint according to this invention will become apparent to those skilled in the art from a perusal of the foregoing specification. Thus, the scope of the invention is limited only by the following claims.

What is claimed is:

1. An all metal joint comprising:
   a pair of flange members, each flange member having a face portion configured to confront a corresponding face portion on the other flange member when said flange members are joined, said flange members making contact with each other at a junction plane;
   said face portion of each flange member comprising a first annular surface region, the first surface region on one flange member intersecting the first surface region on the other flange member at said junction plane, said first surface regions enclosing an angle therebetween that is less than 180°;
   said face portion of each flange member further comprising a second annular surface region and a third annular surface region, said second and third surface regions intersecting each other to form a ridge, said ridge being spaced apart from said junction plane, said second surface region intersecting said first surface region on said face portion of each flange member to form in the face portion of each flange member an annular recess bounded by said first and second surface regions;
   said ridge on one of said flange members confronting and spaced apart from said ridge on the other flange member when said flange members are joined;
   a continuous annular gasket of soft metal configured to be received between said face portions, said ridge on the face portion of each of said flange members penetrating into said gasket when said flange members are joined, whereby gasket material extrudes into said recess and contacts the first surface region on the face portion of each flange member when said flange members are joined;
   said first and second surface regions on the face portion of each of said flange members being configured so that the volume of said recess formed thereby is larger than the volume of gasket material that can be extruded into said recess when said flange members are joined; and
   the distributive compressive force exerted by each of the first, second and third surface regions of the face portion of each flange member upon the gasket material having a component perpendicular to said junction plane, which component acts in a direction tending to separate the gasket from the flange members when the flange members are moved away from each other.

2. The joint of claim 1 wherein said first surface region on the face portion of each of said flange members intersects said junction plane at an acute angle in the range from 60° to 75°, and said third surface region on the face portion of each of said flange members intersects said junction plane at an acute angle in the range from 60° to 75°.

3. The joint of claim 1 wherein said ridge subtends an angle no smaller than 90°.

4. The joint of claim 1 wherein said second surface intersects said junction plane at an acute angle in the range from 15° to 30°.

5. The joint of claim 2 wherein said ridge subtends an angle no smaller than 90°.

6. The joint of claim 1 wherein said face portion of each flange member further comprises a fourth annular surface region intersecting said third surface region, and said gasket has a portion thereof located between and spaced from said fourth surface regions of the two flange members when said flange members make contact with each other at said junction plane.

* * * * *